United States Patent
Lee et al.

(10) Patent No.: US 10,684,444 B2
(45) Date of Patent: Jun. 16, 2020

(54) CAMERA MODULE

(71) Applicant: LG INNOTEK CO., LTD., Seoul (KR)

(72) Inventors: Sang Hyun Lee, Seoul (KR); Jung Hoo Seo, Seoul (KR); Dae Hwan Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 6 days.

(21) Appl. No.: 15/753,125

(22) PCT Filed: Aug. 17, 2016

(86) PCT No.: PCT/KR2016/009001
§ 371 (c)(1),
(2) Date: Feb. 15, 2018

(87) PCT Pub. No.: WO2017/030351
PCT Pub. Date: Feb. 23, 2017

(65) Prior Publication Data
US 2018/0239105 A1    Aug. 23, 2018

(30) Foreign Application Priority Data

Aug. 17, 2015  (KR) .......... 10-2015-0115467
Aug. 24, 2015  (KR) .......... 10-2015-0119105

(51) Int. Cl.
*G03B 17/02*  (2006.01)
*G02B 7/02*   (2006.01)
(Continued)

(52) U.S. Cl.
CPC ............ *G02B 7/028* (2013.01); *G02B 27/00* (2013.01); *G02B 27/0025* (2013.01);
(Continued)

(58) Field of Classification Search
CPC .... G02B 27/00; G02B 27/0025; G02B 7/028; G03B 17/02; G03B 17/55; H04N 5/225; H04N 5/2254; H05B 3/84
See application file for complete search history.

(56) References Cited

U.S. PATENT DOCUMENTS 5,610,756 A  *  3/1997  Lynam ...................... B60R 1/02
                                                              359/267
5,854,708 A  *  12/1998 Komatsu ............... C03C 17/256
                                                              359/512
(Continued)

FOREIGN PATENT DOCUMENTS

JP   2011-066560 A    3/2011
KR   10-0777924 B1   11/2007
(Continued)

OTHER PUBLICATIONS

Examiner provided machine translation of Kinoshita, JP 2011066560 A (Year: 2011).*

(Continued)

*Primary Examiner* — William R Alexander
*Assistant Examiner* — Balram T Parbadia
(74) *Attorney, Agent, or Firm* — Saliwanchik, Lloyd & Eisenschenk

(57) ABSTRACT

The present invention relates to a camera module, and the present invention may comprise: a lens; a heating layer positioned on the lens so as to generate heat when power is supplied thereto; and a heating wire, which is positioned on the surface of the lens or of the heating layer, which generates heat when a current is supplied thereto from an external power supply, and which is electrically connected to the heating layer. The present invention comprises a heating wire, besides the heating layer that comprises a conductive material, and thus can reduce the time taken to supply a (Continued)

heating body with a current, and the reduced heating time accordingly enables rapid heating.

16 Claims, 11 Drawing Sheets

(51) Int. Cl.
*H05B 3/84* (2006.01)
*H04N 5/225* (2006.01)
*G02B 27/00* (2006.01)

(52) U.S. Cl.
CPC .............. *G03B 17/02* (2013.01); *H04N 5/225* (2013.01); *H04N 5/2254* (2013.01); *H05B 3/84* (2013.01)

(56) References Cited

U.S. PATENT DOCUMENTS

| | | | | |
|---|---|---|---|---|
| 2004/0223074 A1* | 11/2004 | Takada | ............... | G02B 7/026 348/360 |
| 2006/0171704 A1* | 8/2006 | Bingle | ............... | B60R 11/04 396/419 |
| 2007/0058070 A1* | 3/2007 | Chen | ............... | G02B 7/102 348/340 |
| 2008/0100933 A1* | 5/2008 | Yuan | ............... | G02B 7/028 359/820 |
| 2011/0199530 A1* | 8/2011 | Kosaka | ............... | G02B 7/02 348/340 |
| 2011/0249120 A1* | 10/2011 | Bingle | ............... | B60R 11/04 348/148 |
| 2012/0170119 A1* | 7/2012 | Chu | ............... | G03B 17/55 359/512 |
| 2012/0212806 A1* | 8/2012 | Shibata | ............... | H04N 5/23212 359/356 |
| 2013/0038783 A1* | 2/2013 | Shimizu | ............... | H04N 5/2254 348/360 |
| 2013/0271641 A1* | 10/2013 | Calvet | ............... | G02B 7/028 348/340 |
| 2015/0234153 A1* | 8/2015 | Park | ............... | G02B 13/0065 348/360 |
| 2017/0038661 A1* | 2/2017 | Ha | ............... | G03B 17/02 |

FOREIGN PATENT DOCUMENTS

| | | |
|---|---|---|
| KR | 10-0862247 B1 | 10/2008 |
| KR | 10-2010-0077789 A | 7/2010 |
| KR | 10-2013-0054160 A | 5/2013 |
| KR | 10-2013-0085928 A | 7/2013 |
| KR | 10-1462983 B1 | 11/2014 |
| WO | WO-2018/014524 A1 | 1/2018 |

OTHER PUBLICATIONS

Supplementary European Search Report dated Jun. 21, 2018 in European Application No. 16837293.6.
International Search Report in International Application No. PCT/KR2016/009001, filed Aug. 17, 2016.

* cited by examiner

CAMERA MODULE

CROSS-REFERENCE TO RELATED APPLICATIONS

This application is the U.S. national stage application of International Patent Application No. PCT/KR2016/009001, filed Aug. 17, 2016, which claims priority to Korean Application Nos. 10-2015-0115467, filed Aug. 17, 2015; and 10-2015-0119105, filed Aug. 24, 2015, the disclosures of each of which are incorporated herein by reference in their entirety.

TECHNICAL FIELD

The teachings in accordance with exemplary and non-limiting embodiments of this invention relate generally to a camera module, and more particularly to a camera module for vehicles (hereinafter referred to as "vehicular camera module").

BACKGROUND ART

In general, a camera module is formed at a lens with frost or moisture under a cold climate condition, and in order to remove the frost or moisture, there is required a separate heating means on a camera, and therefore, the function and performance of a camera module can be maintained by evaporating the frost or moisture and by heating the lens or the camera module.

As one example of the conventionally-used heating means, a camera module was disclosed capable of generating heat by supplying a power to a transparent, heating-capable conductive material, where the conductive material was coated on a lens, and where a separate power was equipped. The conventional art for removing frost or moisture was implemented through coating of a conductive material on a lens surface by an even thickness, where resistance control of the conductive material for generation of heat was performed through adjustment of thickness of conductive material.

However, the heat generation effect may be great when resistance is high under the same voltage/current states, such that the conventional art has suffered from disadvantages of thickly coating the conductive material in order to increase the heat generation effect, whereby there has been a high probability of a photographed image being distorted. Thus, the resistance adjustment through adjustment of coated thickness of conductive material is limited, and therefore, heat generation effect is not that high either.

Furthermore, a current must be supplied using an external power supply due to structural limitation of a camera module, and as a result, it is difficult to apply electrodes to the conductive material by electrically connecting the power with the conductive material.

DETAILED DESCRIPTION OF THE INVENTION

Technical Subject

The present invention is provided to solve the abovementioned problems/disadvantages, and it is an object of exemplary embodiments of the present invention to provide a camera module configured to supply a current to a conductive material of a lens by being formed with a separate conductive part.

Another object of the present invention is to provide a camera module stably arranged with a conductive part by forming the conductive part in a shape of a strip and arranging the strip inside the camera module, and by electrically connecting a heating layer with a PCB (Printed Circuit Board).

Still another object of the present invention is to provide a camera module including a heating layer and a heating wire in order to increase a heating efficiency of lens part in response to supply of a current.

Still further object of the present invention is to provide a camera module formed with a pattern on a heating wire to allow a rapid heating to be implemented on a heating layer.

Still further object of the present invention is to provide a camera module formed with a conductive part that electrically connects a PCB with a heating wire in order to supply a current to the heating wire from the PCB.

Technical Solution

In one general aspect of the present invention, there is provided a camera module, comprising:

a lens including an incident surface to be incident by an outside light and a light emitting surface to emit the light having passed the incident light;

a heating layer positioned on the lens so as to generate heat when power is supplied thereto; and a heating wire, which is positioned on the surface of the lens or of the heating layer, which generates heat when a current is supplied thereto from an external power supply, and which is electrically connected to the heating layer.

Preferably, but not necessarily, the heating layer may be positioned on a portion of the incident surface or the light emitting surface, and the heating wire may be arranged at an area other than an area where the heating layer is positioned on the incident surface or the light emitting surface positioned with the heating layer.

Preferably, but not necessarily, the heating layer may be positioned on an entire surface of any of the incident surface and the light emitting surface, and the heating wire may be interposed between the heating layer and a lens surface on the incident surface positioned with the heating layer or the light emitting surface Preferably, but not necessarily, the heating layer may be positioned on an entire surface of any of the incident surface and the light emitting surface, and the heating wire may be positioned at an external surface of the heating layer.

Preferably, but not necessarily, the conductive material of the heating layer may include any one or more of ITO (Indium Tin Oxide), IZO (Indium Zinc Oxide), ZnO, Graphene and CNT (Carbon Nano Tube).

Preferably, but not necessarily, the heating wire may include a silver nano material formed in a predetermined pattern.

Preferably, but not necessarily, the heating wire may include an anode line and a cathode line each indicating a different polarity, where the anode line and the cathode line are spaced apart from each other.

Preferably, but not necessarily, the anode line and the cathode line may form an arc on the lens surface, and may be alternately arranged toward a center of the lens surface from an external side of the lens surface.

Preferably, but not necessarily, the heating wire may include a plurality of arc-shaped arc parts, each having a different radius, and the plurality of arc parts may have a same center, each connected in a zigzag manner.

Preferably, but not necessarily, the heating wire may be formed in a spiral shape toward a center portion of the lens surface from an external side of the lens, and an anode and a cathode are mutually connected at the center portion.

Preferably, but not necessarily, the camera module may further comprise:

a lens holder wherein the lens is arranged in a plural number, and a lens barrel is included to accommodate a portion of the plurality of lenses, an outermost lens nearest to a subject side in the plurality of lens is positioned at an upper side of the lens barrel to be exposed to an outside, and wherein the lens holder accommodate the lens barrel and fixes the outmost lens;

a front body coupled to the lens barrel and the lens holder; and a rear body coupled to the front body to form an inner space.

Preferably, but not necessarily, the camera module may further comprise:

a PCB arranged at the inner space to be spaced apart from the lens; and a conductive part arranged at an outside surface of lens barrel to electrically connect the heating wire with the PCB.

Preferably, but not necessarily, the conductive part may include a first conductive part arranged at an upper surface of the lens barrel to be electrically connected with the heating wire; and a second conductive part extended at one end from the first conductive part, and arranged at an outer circumferential surface of the lens barrel and electrically connected at the other end to the PCB.

Preferably, but not necessarily, the conductive part may be a flexible PCB (FPCB) or a conductive film.

In another general aspect of the present invention, there is provided a camera module, comprising:

a lens including an incident surface to be incident with an outside light;

a heating layer arranged at the incident surface of the lens to be heatable by a supplied current;

a lens barrel fixing the lens by accommodating the lens;

a PCB so arranged as to be spaced apart from the lens barrel;

a lens holder covering at least a portion of a edge of the incident surface and coupling the lens barrel by accommodating the lens barrel; and a conductive part positioned at an outside of the lens barrel, electrically connecting a heating layer with the PCB, formed in the shape of a strip having a predetermined width, and interposed at least a portion thereof between the lens holder and the incident surface in order to be applied with a pressure by the lens holder.

Preferably, but not necessarily, the lens holder may be formed with a through hole to expose to an outside a lens positioned at an outmost in order to be nearest to a subject, and may further include a pressure part to apply a pressure to the conductive part.

Preferably, but not necessarily, the conductive part may include a first conductive part having a radius of curvature corresponding to that of an edge of the heating layer and interposed between the heating layer and the lens holder, and a second conductive part extended from the first conductive part to contact the PCB, wherein the first conductive part and the second conductive part may be substantially arranged in the shape of "T" and the first conductive part and the second conductive part may be bendable.

Preferably, but not necessarily, the lens barrel may include a first screw part formed at one portion of an outside with a screw thread, and a second screw part formed at the other portion of the outside with a screw thread formed to be spaced apart from the first screw part, wherein at least one portion of each of the first and second screw parts may further include first and second grooves relatively recessed over the screw threads formed at the first and second screw parts in order to allow the conductive part to be positioned.

Preferably, but not necessarily, the lens holder may include a third screw part formed with a screw thread corresponding to the first screw part, and may further include a front body formed with a through hole passed through by a portion of the lens barrel and formed with a fourth screw part corresponding to the second screw part, and a rear body coupled to the front body to form an inner space, wherein the PCB is accommodated inside the inner space to be fixed to the front body or to an inside of the rear body.

Preferably, but not necessarily, the conductive part may be provided in a plural number, and any one of the plurality of conductive parts may be a positive (+) electrode or a negative (−) electrode.

Preferably, but not necessarily, the conductive part may include an anode line where a current is supplied to the heating layer, and a cathode line where a current from the heating layer is restored to a PCB.

Preferably, but not necessarily, the conductive layer may include any one or more of ITO (Indium Tin Oxide), IZO (Indium Zinc Oxide), ZnO, Graphene and CNT (Carbon Nano Tube).

Preferably, but not necessarily, the conductive part may be a flexible PCB (FPCB) or a conductive film.

In still another general aspect of the present invention, there is provided a camera module, comprising:

a lens including an incident surface to be incident with an outside light;

a heating layer arranged at the incident surface of the lens to be heatable by a supplied current;

a lens barrel formed with an insulation material to fix the lens by accommodating the lens;

a PCB so arranged as to be spaced apart from the lens barrel; and a conductive part coated with a conductive material at an outside of the lens barrel by including the conductive material, and electrically connected at one end and the other end with the heating layer and the PCB respectively.

Advantageous Effects

The present invention can advantageously provide a current to a heating layer of a lens by forming a conductive part and electrically connecting the heating layer with a PCB. Furthermore, the present invention is such that the conductive part is advantageously formed in a shape of a strip to allow being accommodated into a camera module to prevent damage, and can improve the reliability of product by more stably connecting the heating layer and the PCB.

An exemplary embodiment of the present invention advantageously comprises a heating wire, in addition to a heating layer including that comprises a conductive material, and thus can reduce the time taken to supply a heating body with a current, and the reduced heating time accordingly enables rapid heating.

Furthermore, an exemplary embodiment of the present invention can advantageously increase a heating effect by increasing resistance over a case where only a heating layer is simply arranged on lens surface to further increase the heating effect, because a heating wire per se formed with a pattern in addition to a heating layer can generate heat.

Still furthermore, an exemplary embodiment of the present invention can advantageously prevent distortion of an image photographed by an image sensor because there is no need to thickly arrange a thickness of a heating layer simply on a lens surface in order to increase resistance.

BEST MODE

Figure 1:
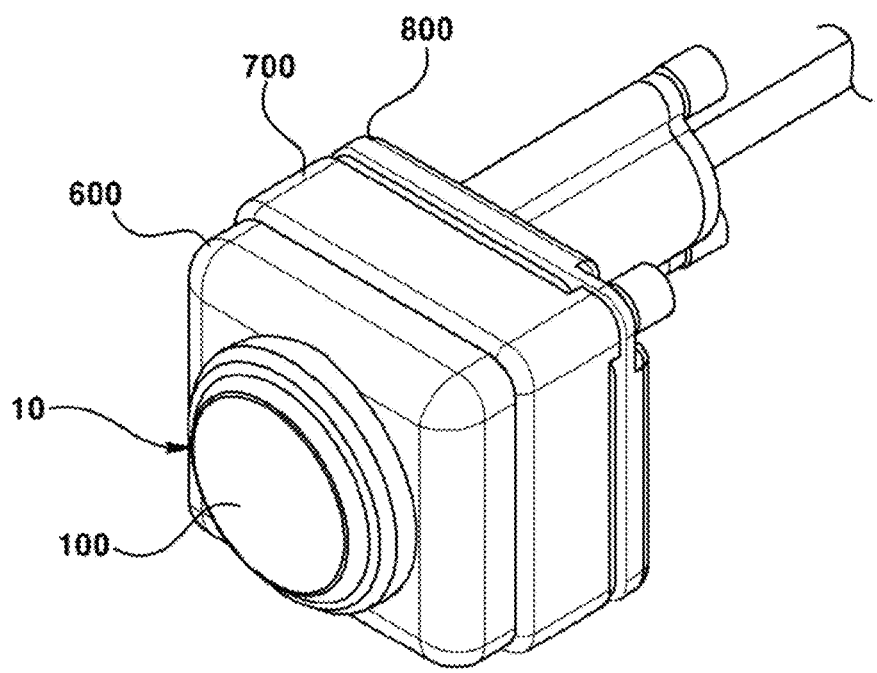
FIG. 1 is a schematic perspective view illustrating a camera module according to an exemplary embodiment of the present invention.

Hereinafter, some of exemplary embodiments of the present invention will be described with reference to the accompany drawings.

Throughout the descriptions, the same reference numerals will be assigned to the same elements in the explanations of the figures, even if shown in different drawings.

Detailed descriptions of well-known functions, configurations or constructions are omitted for brevity and clarity so as not to obscure the description of the present disclosure with unnecessary detail.

Furthermore, the terms "first," "second," "A", "B", (a), (b) and the like, herein do not denote any order, quantity, or importance, but rather are used to distinguish one element from another. In the following description and/or claims, the terms coupled and/or connected, along with their derivatives, may be used. In particular embodiments, connected may be used to indicate that two or more elements are in direct physical and/or electrical contact with each other. "Coupled" may mean that two or more elements are in direct physical and/or electrical contact. However, coupled may also mean that two or more elements may not be in direct contact with each other, but yet may still cooperate and/or interact with each other. For example, "coupled", "joined" and "connected" may mean that two or more elements do not contact each other but are indirectly joined together via another element or intermediate elements.

Hereinafter, a configuration of a camera module according to an exemplary embodiment of the present invention will be described with reference to the accompany drawings.

FIG. 1 is a schematic perspective view illustrating a camera module according to an exemplary embodiment of the present invention.

Referring to FIG. 1, the camera module according to an exemplary embodiment of the present invention may include a lens part (10), a front body (700) and a rear body (800).

Figure 2:
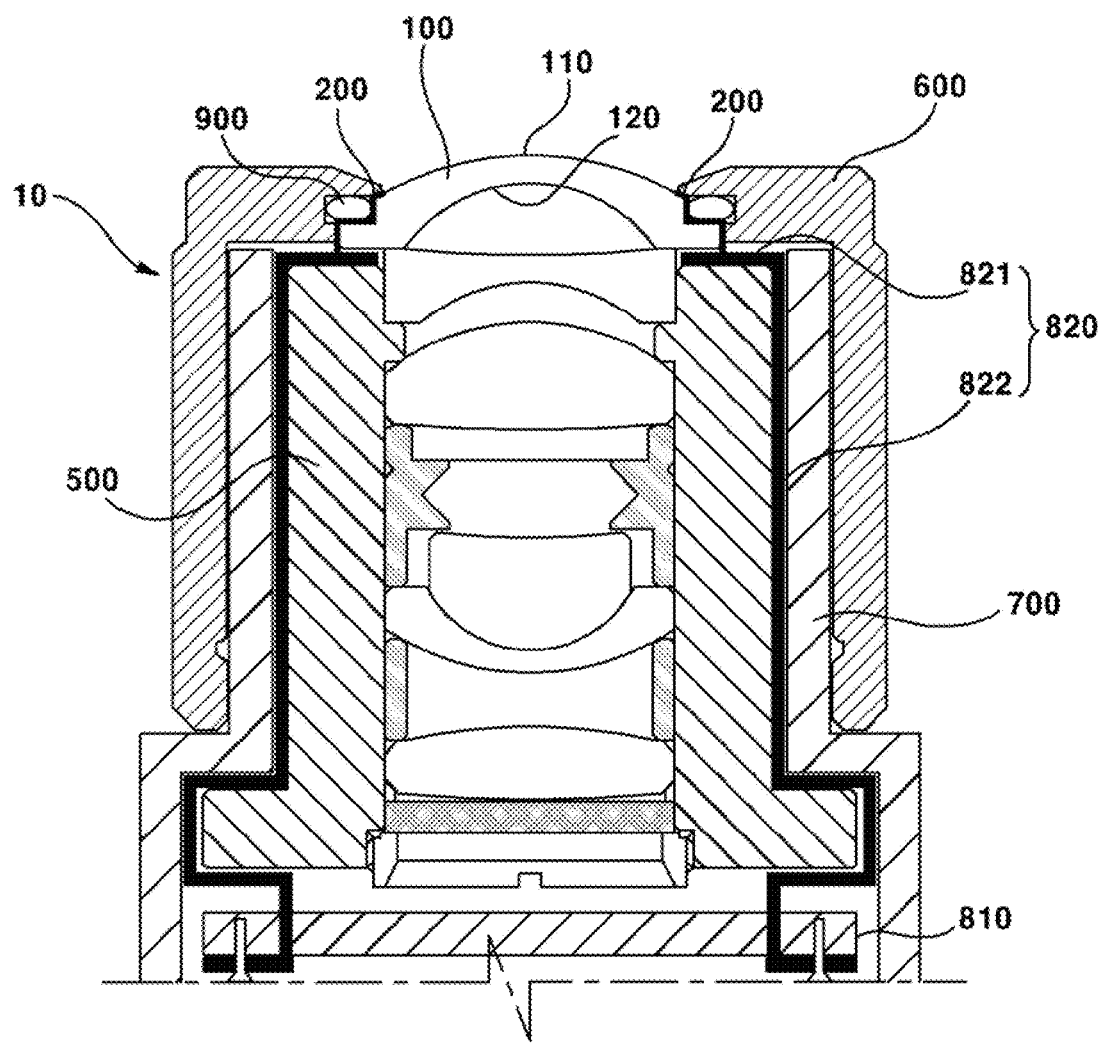
FIG. 2 is schematic cross-sectional view illustrating a lens part of a camera module according to an exemplary embodiment of the present invention.

FIG. 2 is schematic cross-sectional view illustrating a lens part (10) of a camera module according to an exemplary embodiment of the present invention.

Referring to FIG. 2, the lens part (10) may include a plurality of lenses (100). Each of the plurality of lenses (100) may be formed with a lens surface, where the lens surface may include an incident surface (110) to be incident by an outside light, and a light emitting surface (120) formed at a position opposite to that of the incident surface (110) to emit the light having passed the incident light.

The lens part (10) may further include a lens barrel (500) that fixes the plurality of lenses (100). The lens barrel (500) may take a both ends-opened pillar shape to accommodate/fix therein the plurality of lenses (11), and each of the plurality of lenses (100) may be spaced apart by a spacer (not shown) or an inwardly-protruded lug (not shown). Furthermore, an outermost lens (100) at a subject side may be so arranged as to partially abut to one end of the lens barrel (500) by not being accommodated inside the lens barrel (500).

Furthermore, the lens part (10) may further include a lens holder (600). The lens holder (600) may be formed at one side with an exposure hole (not shown) in order to expose the incident surface (110) of the outermost lens (100). That is, the outermost lens (100) may be exposed through the exposure hole of the lens holder (600). In addition, the other side of the lens holder (600) may be opened to allow facing one side of the front body (700).

Furthermore, the lens part (10) may be abutted to the front body (700), where the lens barrel (500) of the lens part (10) may be accommodated into the front body (700) to allow an outside of the lens barrel (500) to be coupled to an inner circumferential surface of the front body (700). Although FIG. 2 has not illustrated the front body (700) between the lens barrel (500) and the lens holder (600), FIG. 2 may be understood to have omitted the front body (700) in order to explain a conductive part (320, described later).

Although FIG. 2 has illustrated that the other side of the lens barrel (500) is protruded toward a direction distancing from an optical axis to allow the lens holder (600) to face the other side of the lens barrel (500), this illustration is just an example, and the present invention is not limited thereto, and the lens barrel (500), the lens holder (600) and the front body (700) may be variably formed depending on a manufacturer's intention. For example, the lens holder (600) and the front body (700) may be integrally formed to be coupled to the lens barrel (500).

Meantime, a sealing member (900) for waterproof may be positioned between the outermost lens (100) and the lens holder (600) or between the front body (700) and the read body (800).

Figure 3:
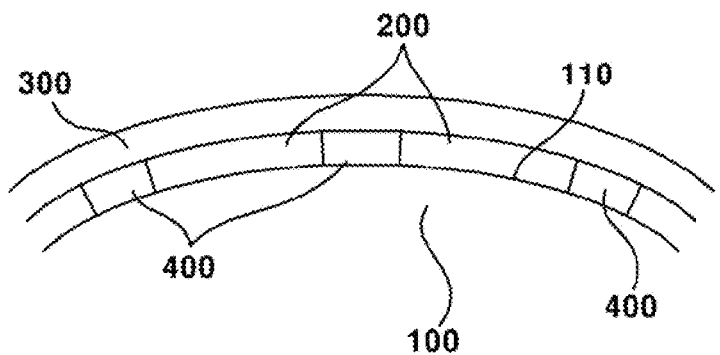
FIG. 3 is a schematic cross-sectional view illustrating a portion of a lens of a camera module according to an exemplary embodiment of the present invention.
Figure 4:
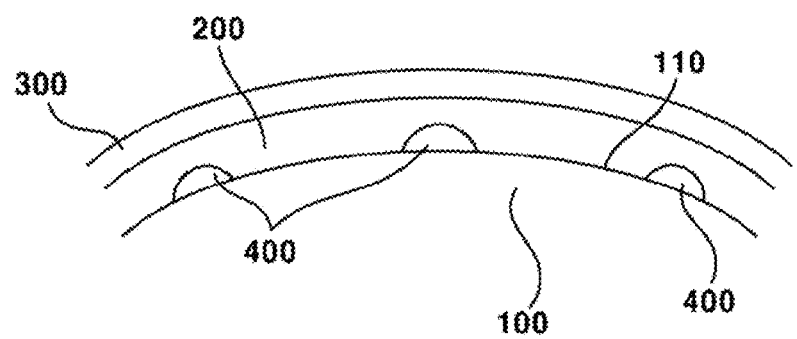
FIG. 4 is a schematic view illustrating a modification of FIG. 3.
Figure 5:
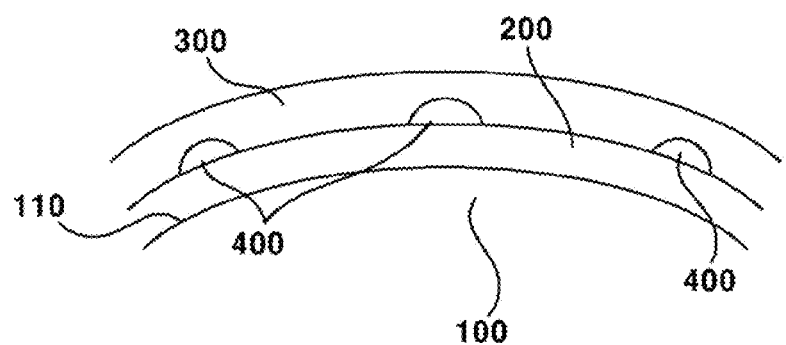
FIG. 5 is a schematic view illustrating another modification of FIG. 3.

FIG. 3 is a schematic cross-sectional view illustrating a portion of a lens of a camera module according to an exemplary embodiment of the present invention, FIG. 4 is a schematic view illustrating a modification of FIG. 3, and FIG. 5 is a schematic view illustrating another modification of FIG. 3.

Referring to FIGS. 3 to 5, a lens surface of the lens (100) may be positioned with a heating layer (200) and a heating wire (400). Although FIGS. 3 to 5 have illustrated that the heating layer (200) and the heating wire (400) are arranged on the incident surface (110) in the lens surface, the heating layer (200) and the heating wire (400) may be formed on the light emitting surface (120) depending on an intention of a user or a manufacturer.

Furthermore, the heating layer (200) and the heating wire (400) are preferably arranged to mutually abut because the heating layer (200) and the heating wire (400) are electrically connected. Referring to FIG. 3, the heating layer (200) may be positioned on a portion of the incident surface (110) or the light emitting surface (120), where the heating wire (400) may be arranged at an area other than an area where the heating layer (200) is positioned on the incident surface (110) or the light emitting surface (120) positioned with the heating layer.

Referring to FIG. 4, the heating layer (200) may be positioned on any one entire area of the incident surface (110) or the light emitting surface (120), and the heating wire (400) may be positioned between the heating layer (200) and the lens surface on the incident surface (110) positioned by the heating layer (200) or the light emitting layer (120).

Referring to FIG. 5, the heating layer (200) may be positioned on any one entire area of the incident surface (110) or the light emitting surface (120), and the heating wire (400) may be positioned at an outside of the heating layer (200). That is, the heating layer (200) and the heating wire (400) may be positioned by selecting any one of the incident layer (110) of the lens (100) or the light emitting surface (120).

The heating layer (200) may be formed by being coated with a conductive material on the lens surface to thereby form a layer. The conductive material forming the heating layer may preferably include any one or more of ITO (Indium Tin Oxide), IZO (Indium Zinc Oxide), ZnO, Graphene and CNT (Carbon Nano Tube). However, the present invention is not limited thereto, and any transparent and electrically conductive material may be sufficient for use.

The heating wire (400) is preferably a heatable conductive member, and may be formed by including a silver nano material. Furthermore, the heating wire (400) is preferably formed with a line having a width less than 200 nm, but the present invention is not limited thereto. If the width of the heating wire (400) exceeds 200 nm, and although the lens (100) may be heated by supplying a current to the heating wire (400), resistance becomes lower over a case where the width of the heating wire (400) is limited to less than 200 nm and therefore, the generation of heat is not efficient.

In other words, when the width of heating wire (400) is formed by exceeding 200 nm, the heating wire (400) may broaden an area occupied on the lens surface to relatively reduce the length, and to reduce a resistance value, whereby the resistance value becomes lower to make it difficult to generate heat from the heating wire (400) per se. Furthermore, when the width of the heating wire (400) is formed by exceeding 200 nm, an image photographed by the heating wire (400) may be seen to be distorted.

Figure 6:
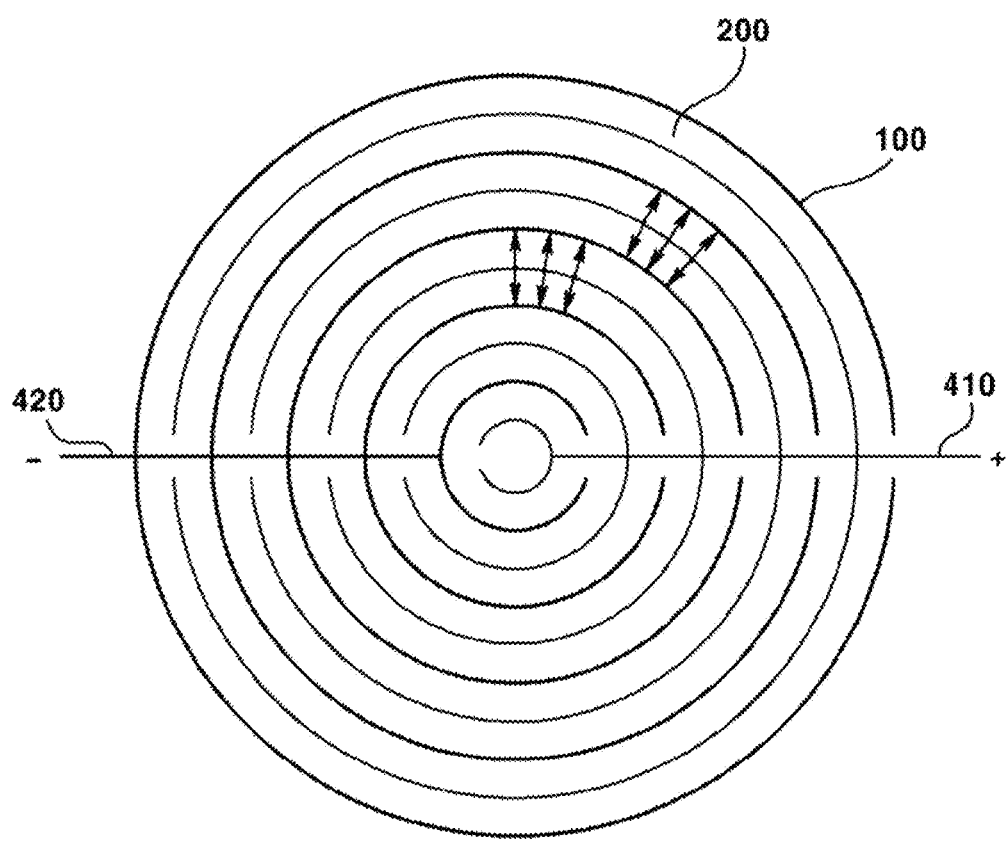
FIG. 6 is a schematic view illustrating a pattern of heating wire formed on a lens of a camera module according to an exemplary embodiment of the present invention.
Figure 7:
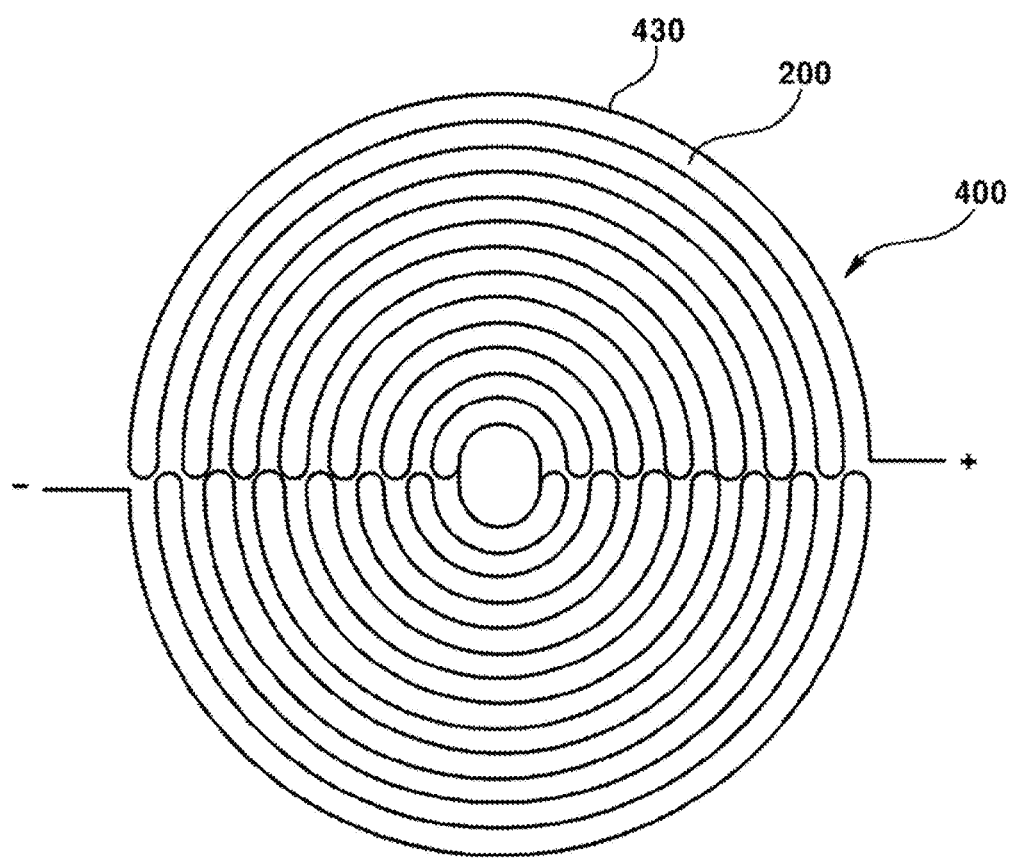
FIG. 7 is a schematic view illustrating a modification of FIG. 6.
Figure 8:
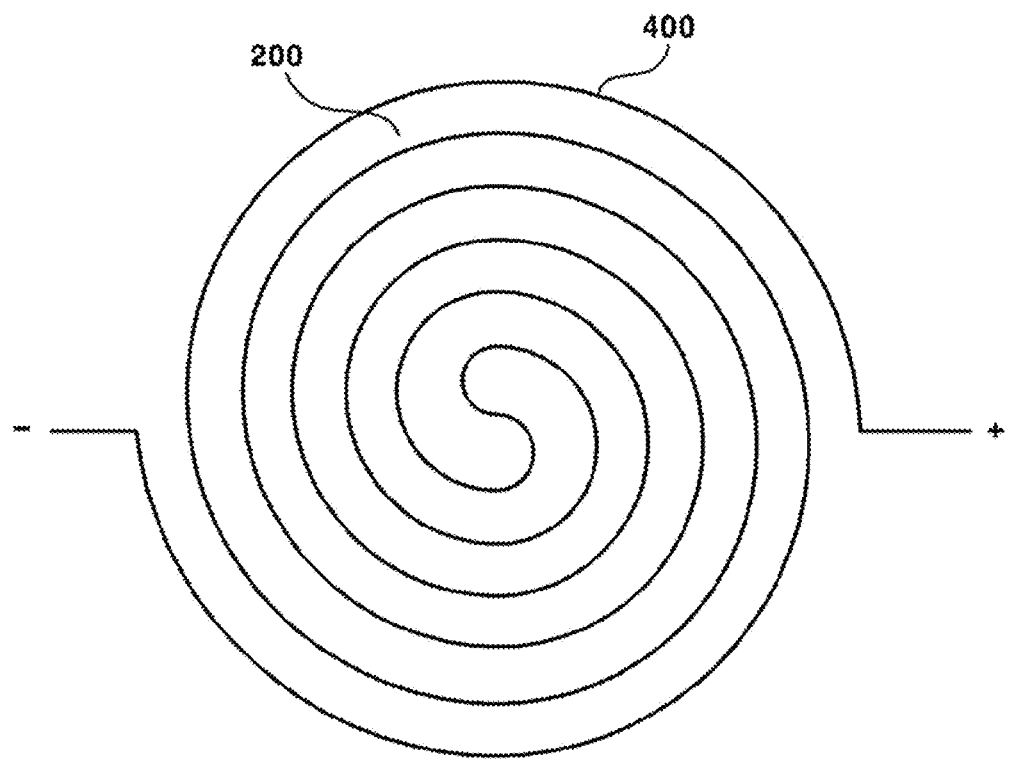
FIG. 8 is a schematic view illustrating another modification of FIG. 6.

FIG. 6 is a schematic view illustrating a pattern of heating wire formed on a lens of a camera module according to an exemplary embodiment of the present invention, FIG. 7 is a schematic view illustrating a modification of FIG. 6, and FIG. 8 is a schematic view illustrating another modification of FIG. 6.

Although each of the heating wire (400) and the heating layer (200) can generate heat by itself when a current is supplied, the exemplary embodiment of the present invention goes through a process in which a current is transmitted to the heating layer (200) through the heating wire (400), and the current transmitted to the heating layer (200) is transmitted again to the heating wire (400).

Referring to FIG. 6, the heating wire (400) may be formed by being divided to a positive (+) electrode line (410) and a negative (−) electrode line (420). At this time, the positive electrode line (410) and the negative electrode line (420) may be arranged by being mutually avoided and spaced apart. That is, the positive electrode line (410) may be straightly formed from one side of an outside of the lens (100) to a center area of lens surface, and the negative electrode line may be straightly formed from the other side of the outside at the lens (100) to a center area of lens surface, where an one side-opened circle (i.e., arc) may be formed where the straightly formed positive electrode line (410) or the negative electrode line (420) are respectively connected and the center and the outside of the lens (100) are matched, and where the positive electrode line (410) and the negative electrode line (420) are not mutually met, but mutually alternately arranged toward the center of the lens surface from the outside of the lens (100).

Furthermore, the heating wire (400) and the heating layer (200) are formed with an electronically conductive material, such that a current supplied through the positive electrode line (410) may be transmitted to the negative electrode line (420) through the heating layer (200), where the heating wire (400) and the heating layer may be heated.

Referring to FIG. 6, a distance, where the positive electrode line (410) and the negative electrode line (420) are mutually closest, is even at any point of the heating wire (400), such that speed of a current being transmitted to the negative electrode line (420) from the positive electrode line (410) through the heating layer (200) can be also improved, and a heating effect can be more efficient over a conventional case where only the heating layer (200) is formed on the lens surface without the heating wire (400).

Referring to FIG. 7, the heating wire (400) may be formed at one end with a positive (+) electrode and formed at the other end with a negative (−) electrode. Furthermore, the heating wire (400) may include a plurality of arc part (430) each having a different radius and having an arc shape, and the plurality of arc parts (430) may be arranged in a shape of having concentricity, each connected in a zigzag manner.

Although FIG. 7 has illustrated one heating wire (400), the heating wire (400) may be divisibly formed at any one portion and may include a positive electrode line and a negative electrode line as illustrated in FIG. 6.

Referring to FIG. 8, the heating wire (400) may be so formed as to concentrate in a spiral shape from an outside of the lens surface toward a center area of the lens surface. That is, the heating wire (400) may be formed at each end with a positive (+) electrode and a negative (−) electrode, where the heating wire (400) may be also formed in a spiral shape to a clockwise direction or a counterclockwise direction from each of positive electrode and the negative electrode to be connected at a center.

Furthermore, although FIG. 8 has illustrated one heating wire (400), the heating wire (400) may be divisibly formed at any one portion and may include a positive electrode line and a negative electrode line as illustrated in FIG. 6.

In cases of FIGS. 7 and 8, a current may be transmitted from a positive electrode (anode) to a negative electrode (cathode) only through the heating wire (400), or may be transmitted from the heating wire (400) to the heating layer (200) or in turn from the heating layer (200) to the heating wire (400). That is, each resistor in the heating wire (400) and the heating layer (200) may be serially connected or connected in parallel in the exemplary embodiment of the present invention, and the heat may be also generated through a serial or parallel connection of resistors.

The heating wire (400) is merely an exemplary embodiment of the present invention in FIGS. 6 to 9, and a pattern formation of the heating wire (400) is not limited to the foregoing discussion.

In addition, the heating layer (200) and the heating wire (400) may be coated on the lens surface by way of masking method. For example, in order to coat the heating wire (400) by way of any one shape in the patterns in FIGS. 6 to 8, a mask may be prepared, the mask may be attached to the lens surface to be coated, a material forming the heating wire (400) of the heating layer (200) may be sprayed, and the heating layer (200) or the heating wire (400) may be arranged in a predetermined pattern on the lens surface.

As illustrated in FIGS. 3 to 5, when a manufacturer intends to arrange the heating layer (200) and the heating wire (400), the masking order thus mentioned may be changed.

Figure 9:
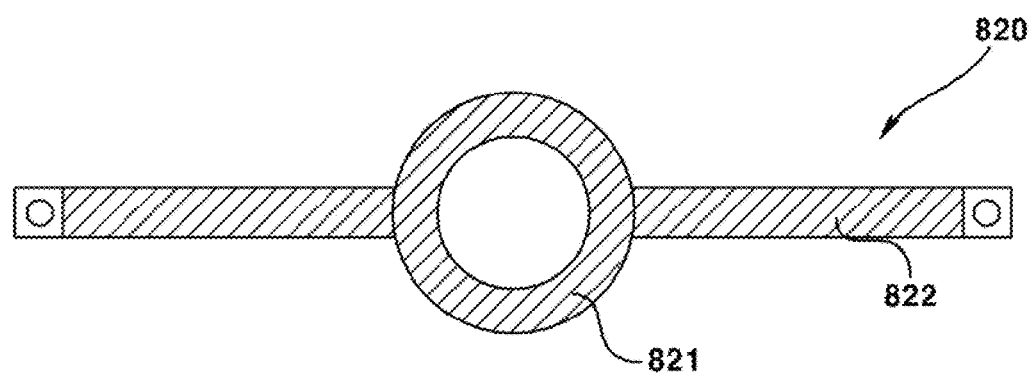
FIG. 9 is a schematic view illustrating a conductive part of a camera module according to an exemplary embodiment of the present invention.

FIG. 9 is a schematic view illustrating a conductive part (320) of a camera module according to an exemplary embodiment of the present invention.

Referring to FIGS. 2 and 9, an inner space formed by the front body (700) and the rear body (800) may be arranged with a PCB (810). The PCB (810) may be arranged in a plural number depending on a manufacturer's or a user's intention, and may further include an image sensor (not shown) to convert a light having passed the lens (100) to an electric signal by being spaced apart from the lens (100). Furthermore, the heating wire (400) arranged on the incident surface (110) or the light emitting surface (120) of the lens (100) may be electrically connected to the PCB (810) through the conductive part (320). The conductive part (320) may be preferably formed in a shape of a thin strip such as a tape to allow the lens barrel (500), the lens holder (600) and the front body (700) to be easily coupled.

For example, the conductive part (320) may take a strip shape like a copper tape having an electric conductivity, and the exemplary embodiments of the present invention may use a flexible PCB (FPCB) including a conductive wire (not shown). The FPCB is covered with a coverlay film at an outside of the conductive wire such that the conductive wire is not exposed to outside.

Meantime, the conductive part (320) may be coated or applied on a portion of outermost lens (100) and an outside of lens barrel (500) in order to allow the conductive material to electrically connect the heating wire (400) and the PCB (810), where the PCB (810) may be connected to the conductive material coated on an outside of the lens barrel (500) by including a separate conductive material because the PCB (810) is arranged by being spaced apart from the lens barrel (500). At this time, it is preferable that the lens barrel (500), the lens holder (600) and the front body (700) be formed with plastic, which is an insulation material, and an insulation coating that wraps the conductive part (320) coated with conductive material coated on the outside of the lens barrel (500) may be further included.

Referring to FIG. 9, the conductive part (320) may include a first conductive part (821) arranged at an upper surface of lens barrel (500) and a second conductive part (822) connected at one end from the first conductive part (821). The first conductive part (821) may take a center-hollowed cylinder shape to correspond to a shape of the lens (100) and may be arranged near to an edge on the upper surface of the lens barrel (500). The first conductive part (821) is preferably formed with a cylindrical shape, but may be changed in shape depending on a manufacturer's intention, for example, a polygonal shape.

The second conductive part (822) may be formed by being extended from the first conductive part (821). That is, the second conductive part (822) may be extended at one end from the first conductive part (821) toward an outside, and connected at the other end to the PCB (810). Although FIG. 9 has illustrated that the second conductive part (822) is straightly extended to both ends of the first conductive part (821) to be divided to two pieces, this configuration may be changed depending on a manufacturer's intention. For example, the second conductive part (822) may be formed in a curved shape in consideration of assembly of elements of camera module according to an exemplary embodiment of the present invention, may be lopsidedly arranged by not facing each other about a center of the first conductive part (821), and may be arranged in more than three pieces. Furthermore, the second conductive part (822) may be provided in one piece, and two or more conductive wires may be provided inside of the said one second conductive part, where an exposed conductive wire may be connected at one end to an anode and a cathode and the exposed conductive wire may be electrically connected at the other end to the PCB (810).

Hence, the PCB (810) can transmit a current supplied from an outside power supply to a positive (+) electrode of the heating wire (400) through the second conductive part (822) and the first conductive part (821). Furthermore, the current may be sequentially transmitted to the positive electrode of the heating wire (400) and to the negative electrode of the heating wire (400), and may be in turn transmitted to the PCB (810) through the first and second conductive parts (821, 822).

An AR (Anti-Reflection) coating layer (140) may be arranged toward an outside of the incident surface (110) at the lens (100). That is, the incident surface (110) may be arranged with the heating layer (200) and the heating wire (400), and an outside of the heating layer (200) and the heating wire (400) may be arranged with the AR coating layer (300). The AR coating is to obtain a clear image by restricting the reflection of light introduced from outside. The AR coating layer (300) may reflect the light on a predetermined area among wavelengths of light depending on formation method. Furthermore, an AR coating material may be coated or applied, or a currently-marketed AR coating film may be attached to form the AR coating layer (300) according to the exemplary embodiment of the present invention. Thus, the camera module according to an exemplary embodiment of the present invention can obtain a clearer image, prevent the heating layer (200) and the heating wire (400) from being exposed to outside by the AR coating layer (300), and protect the heating layer (200) and the heating wire (400).

Figure 10:
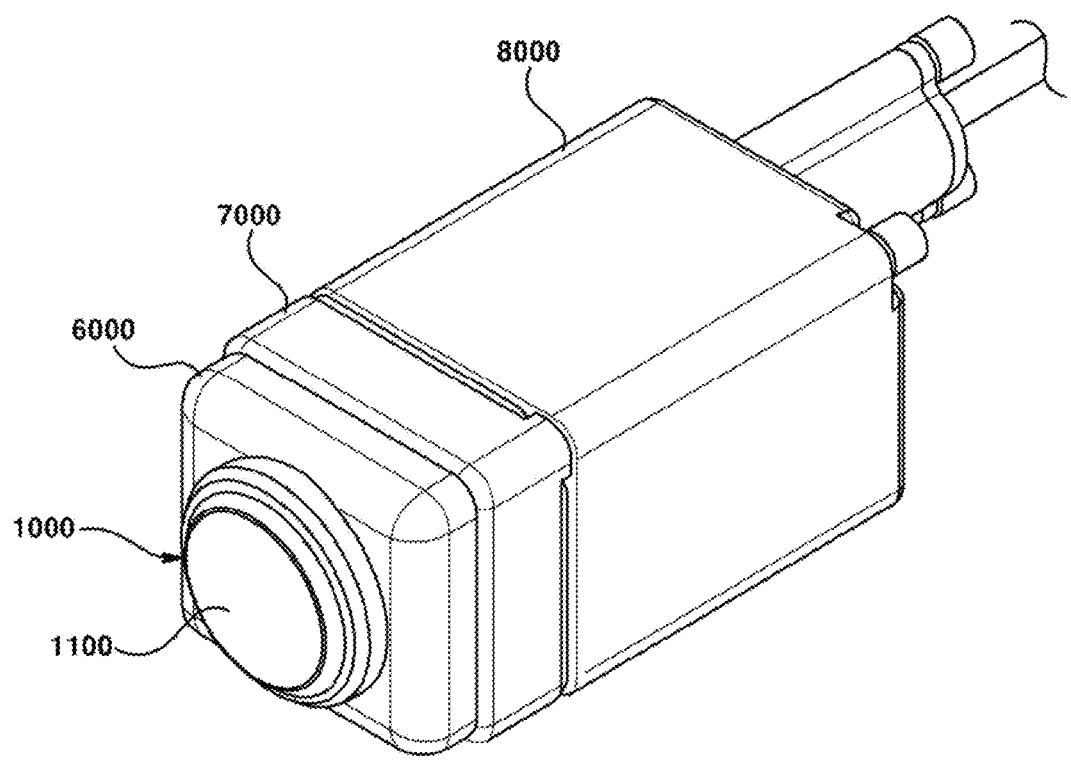
FIG. 10 is a schematic perspective view illustrating a camera module according to an exemplary embodiment of the present invention.

FIG. 10 is a schematic perspective view illustrating a camera module according to an exemplary embodiment of the present invention.

Referring to FIG. 10, the camera module according to an exemplary embodiment of the present invention may include a lens (1000), a lens holder (6000), a front body (7000) and a rear body (8000).

The lens (1000) may be provided in a plural number, and may include, among the plurality of lenses, an outermost lens (1000a) disposed at a nearest position to a subject, where the outermost lens (1000a) may include an incident surface (1100) incident of a light from an outside, and an light emitting surface (1200) emitting the incident light. Furthermore, the incident surface (1100) of the outermost lens (1000a) nearest to the subject may be formed with a heating layer (2000). The heating layer (2000) may be formed with a transparent material to generate heat using a supplied current, and may include one or more of an ITO (Indium Tin Oxide), a CNT (Carbon Nano Tube) and a Graphene, and various other materials than the abovementioned materials may be used for the heating layer (2000) as long as the materials are transparent and electrically conductive.

Figure 11:
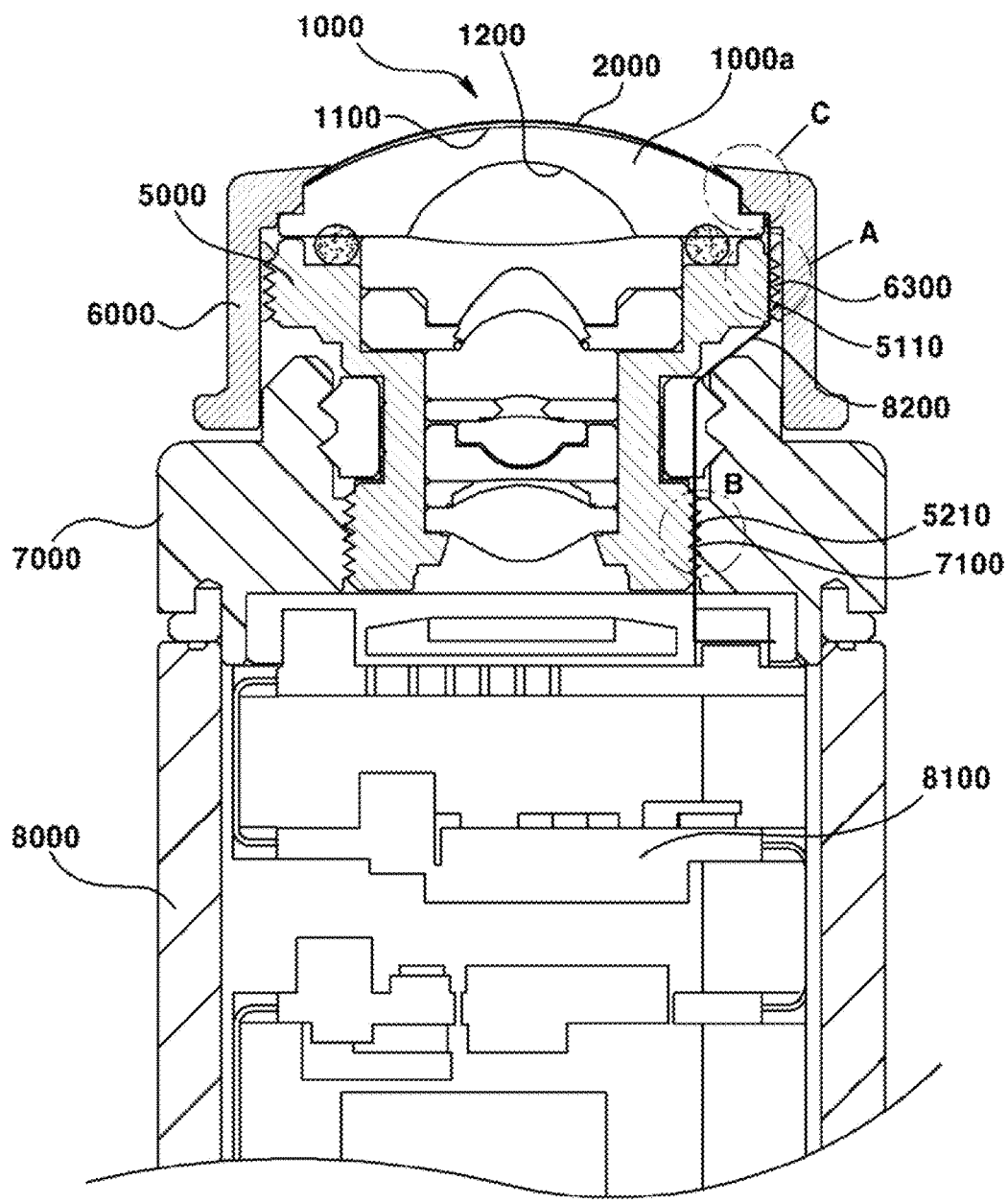
FIG. 11 is schematic cross-sectional view illustrating a camera module according to an exemplary embodiment of the present invention.

FIG. 11 is schematic cross-sectional view illustrating a camera module according to an exemplary embodiment of the present invention.

Referring to FIG. 11, the lens (1000), which is provided in a plural number, may be fixed by a lens barrel (5000). In other words, the lens barrel (5000) may take a both ends-opened cylindrical shape, may accommodate a plurality of lenses (1000), which is then fixed therein, where each of the plurality of lenses may be spaced apart by a spacer (not shown) or an inwardly-protruded lug (not shown). Furthermore, the outermost lens (1000a) toward the subject may not be accommodated to the lens barrel (5000) but may partially abut to one end of the lens barrel (5000). The lens barrel (5000) may be formed with an insulation material such as plastic. The lens barrel (5000) may be formed at an outside with a screw thread, and may include a first screw part (5100) and a second screw part (5200), each spaced apart. The first screw part (5100) may mutually correspond to a screw thread formed on a third screw part (6300) of a lens holder (6000, described later), and may be screw-connected to the lens barrel (5000) and the lens holder (6000). Furthermore, the second screw part (5200) may mutually correspond a screw thread formed on a fourth screw part (7100) of a front body (7000, described later), and may be screw-connected to the lens barrel (5000) and the front body (7000).

Meantime, the lens barrel (5000) may be disposed at an outer circumferential surface with a conductive part (8200, described later). At this time, the first screw part (5100) and the third screw part (6300) may respectively include a recessed first mounting part (5110) and a recessed second mounting part (5210) to prevent a conductive part (8200) from being damaged between the screw-connected lens barrel (5000) and the lens holder (6000) or between the lens barrel (5000) and the front body (7000).

A PCB (8100) may be spaced apart from the lens (1000) along an optical axis. The PCB (8100) may be arranged in a plural number, and may be accommodated into an inner space formed by the front body (7000, described later) and the rear body (8000). Albeit not being illustrated in the drawings, the PCB (8100) may be mounted with an image sensor (not shown) that converts a light incident by passing through the lens (1000) to an electrical signal.

The lens holder (6000) may apply an outermost lens (1000a) to the lens barrel (5000). The outermost lens (1000a) may not be accommodated into the lens barrel (5000) and instead may be interposed between the lens barrel (5000) and the lens holder (6000). That is, the lens holder (6000) may be formed with a through hole (6100) to accommodate the outermost lens (1000a) and the lens barrel (5000), and may apply a pressure to an edge of the outermost lens (1000a) to allow a portion of the outermost lens (1000a) to be exposed to an outside through the through hole (6100). In other words, the lens holder (6000) may be screw-connected with the lens barrel (5000), and may apply a pressure to the outermost lens (1000a) not accommodated into the lens barrel (5000) through the screw-connection.

The front body (7000) may be inserted and fixed at one side of the lens holder (6000) by a portion of the lens barrel (5000). Furthermore, the lens barrel (5000) and the front body (7000) may be screw-connected. The front body (7000) may be coupled with the rear body (8000, described later) to form an inner space.

The rear body (8000) may accommodate the PCB (8100) in an inner space formed by being coupled with the front body (7000). In addition, the rear body (8000) may be inserted into the inner space by passing through a cable (not shown) formed at a side opposite to the front body (7000), where the cable may be electrically connected to the PCB (8100).

Figure 12:
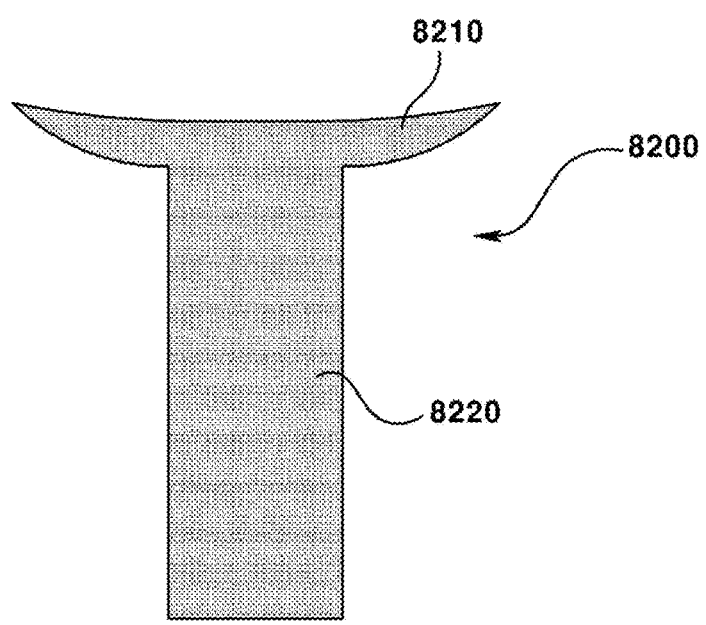
FIG. 12 is a schematic view illustrating a conductive part of a camera module according to an exemplary embodiment of the present invention.

FIG. 12 is a schematic view illustrating a conductive part (8200) of a camera module according to an exemplary embodiment of the present invention.

Referring to FIG. 12, the conductive part (8200) may electrically connect the heating layer (2000) with the PCB (8100).

Referring to FIG. 12, the conductive part (8200) may include a first conductive part (8210) and a second conductive part (8220), where each of the first conductive part (8210) and the second conductive part (8220) may be arranged in a substantially T'shape. Furthermore, albeit not being illustrated in the drawings, the conductive part (8200) may be such that the first conductive part (8210) and the second conductive part (8220) are arranged in a bent style of a substantially 'ㄱ' shape. The abovementioned first conductive part (8210) and the second conductive part (8220) may be variably shaped or arranged depending on a manufacturer's intention.

The first conductive part (8210) may be arranged at an edge side of an outside of the heating layer (2000). The first conductive part (8210) may be concavely formed at one side to form a curvature corresponding to an edge portion of the incident surface (1100) of the outermost lens (1000a). Furthermore, the other side of the first conductive part (8210) may be so arranged as to match a portion of an edge at the incident surface (1100), and the first conductive part (8210) may be interposed between the heating layer (2000) and the lens holder (6000, described later).

Figure 14:
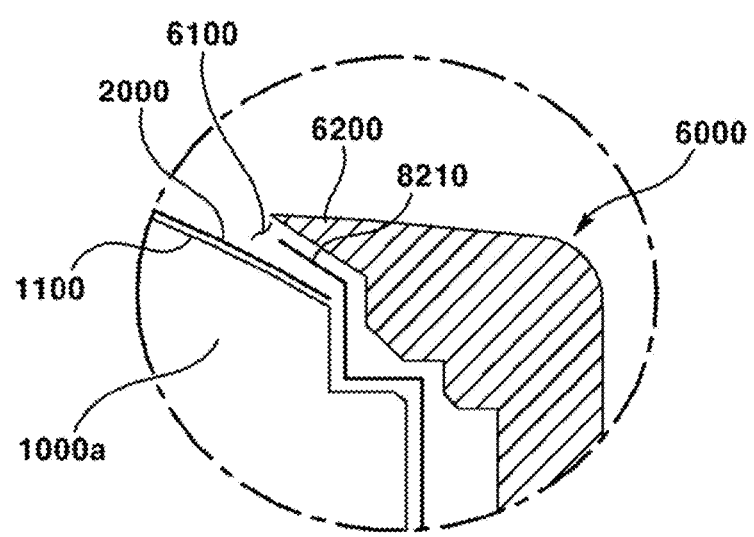
FIG. 14 is a schematic view illustrating a lens holder being arranged on a lens at a camera module according to an exemplary embodiment of the present invention, particularly showing C of FIG. 11.

Referring to FIG. 14, the first conductive part (8210) may contact an upper surface of the edge of the heating layer (2000) by being arranged at the upper surface of the edge. Furthermore, albeit not being illustrated in the drawings, a portion of the edge at the heating layer (2000) may be such that the first conductive part (8210) is inserted into a groove formed by being relatively recessed to allow being contacted to the heating layer (2000), whereby an upper surface of the first conductive part (8210) and an upper surface of the heating layer (2000) may be matched in terms of curvature.

Furthermore, the first conductive part (8210) may be arranged at a portion of the edge of the incident surface of the outermost lens (1000a), and a remaining area of the incident surface (1100) may be arranged with the heating layer (2000) to allow an upper surface of the first conductive part (8210) and an upper surface of the heating layer (2000) to be matched in terms of curvature while the first conductive part (8210) and the heating layer (2000) are being abutted.

The second conductive part (8220) may be extended from the first conductive part (8210) to form a strip shape having a predetermined width, and may be arranged along an outer circumferential surface of the lens barrel (5000). That is, the second conductive part (8220) may be connected at one end with or extended to the first conductive part (8210), and the other end may be connected to the PCB (8100), where the second conductive part (8220) and the PCB (8100), or the second conductive part (8220) and the heating layer (2000) are electrically connected. The second conductive part (8220) may be preferably formed in width at 1~3 mm, where the width of 2 mm may be the most preferable. If the width of the second conductive part (8220) is smaller than 1 mm, it is difficult to connect electrodes, and if the width is greater than 3 mm, there may be generated a mechanical problem to make it difficult to couple.

Meantime, the first and second conductive parts (8210, 8220) may be bendable from the outside-exposed heating layer (2000) to the PCB (8100) along an outer circumferential surface of the lens barrel (5000). Furthermore, the PCB (8100) may include a connector (not shown) to be electrically connected to the conductive part (8200), and the connecting method is not limited thereto and various other methods may be employed depending on a manufacturer's intention as long as being electrically connectible.

The first and second conductive parts (8210, 8220) forming the conductive part (8200) may be formed with a flexible PCB (Flexible Printed Circuit Board, FPCB). At this time, a conductive wire (not shown) through which a current can be conductive may be formed on the PCB, and an insulation layer such as a coverlay may be arranged at an outside of the conductive wire. The conductive wire may electrically connect the heating layer (2000) and the PCB (8100). Meantime, the conductive part (8200) may be formed with a conductive tape. For example, the conductive part (8200) may be formed with a copper tape. At this time, the conductive part must be provided with a separate insulation member such as the coverlay. The conductive part (8200) may be provided in a plural number. At this time, any one of the plurality of conductive parts (8200) may be a positive (+) electrode (anode) or a negative (−) electrode (cathode).

Furthermore, the conductive part (8200) may include both a positive electrode (anode) wire (not shown) and a negative (cathode) wire (not shown). In this case, an outside power may supply a current to the PCB (8100), where the PCB (8100) may transmit the current to the heating layer (2000) through the positive electrode wire of the conductive part (8200), and where the current may be transmitted to the PCB (8100) through the negative electrode wire of the conductive part (8200) and may be returned to the outside power.

The camera module according to an exemplary embodiment of the present invention may be such that the conductive part (8200) may be linearly applied or coated at an outer circumferential surface of the lens barrel (5000), not the FPCB, with a conductive material.

That is, the conductive material, like the conductive wire, may be electrically connected at one end to the heating layer (2000) from an outside of the lens barrel (5000), and may be electrically connected at the other end to the PCB (8100). At this time, the lens barrel (5000) and the PCB (8100) are spaced apart from each other, such that the conductive material, i.e., the other end of the conductive part (8200) and the PCB (8100) may be provided with a separate electric second conductive member (not shown). Furthermore, in order to prevent the conductive part (8200) formed with conductive material from being damaged, first and second mounting grooves (5110, 5200, described later) may be formed. In addition, an outside of the conductive part (8200) applied or coated on an outside of the lens barrel (5000) may be further coated with insulation material.

Figure 13:
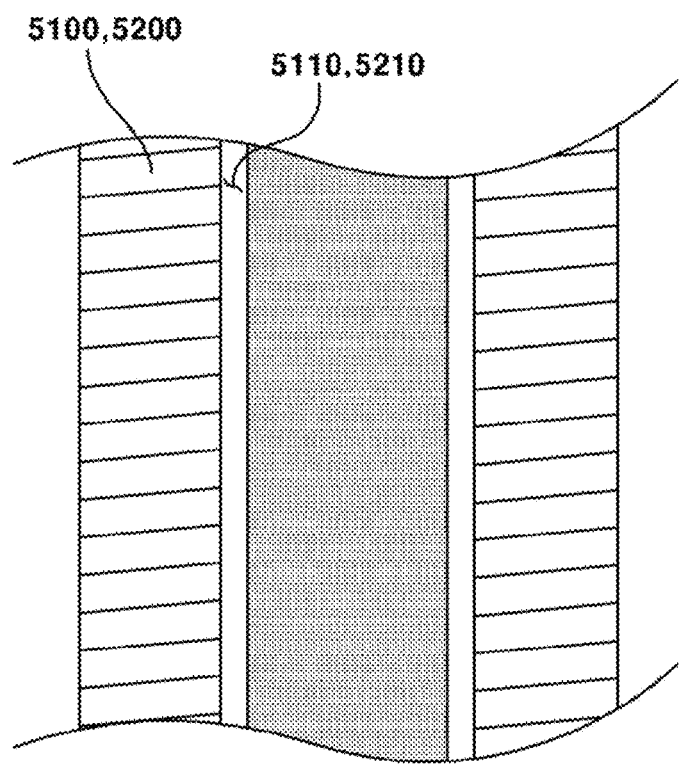
FIG. 13 is a schematic view illustrating a conductive part being arranged on a screw part at a camera module according to an exemplary embodiment of the present invention, particularly showing A and B of FIG. 11.

FIG. 13 is a schematic view illustrating a conductive part (8200) being arranged on a screw part (5100, 5200) at a camera module according to an exemplary embodiment of the present invention, particularly showing A and B of FIG. 11.

Referring to FIG. 13, the lens holder (6000) may include, at an inner circumferential surface, a third screw part (6300) formed with a screw thread corresponding to that of a first screw part (5100) of the lens barrel (5000). The third screw part (6300) may be coupled to the first screw part (5100). The first screw part (5100) may not be formed at a partial portion with a screw thread, but instead formed with a relatively recessed first mounting groove (5110) over the screw thread. The first mounting groove (5110) may be formed with a width wider than that of the second conductive part (8220) to allow a second conductive part (8220) of the conductive part (8200) to be arranged, and the height of the screw thread is formed higher than the thickness of the second conductive part (8220), whereby even if the second conductive part (8220) of the conductive part (8200) is mounted in the first mounting groove (5110), the screw-connection between the lens holder (6000) and the lens barrel (5000) is not affected, and damage to the conductive part (8200) by the screw thread can be also prevented.

To be more specific, the first mounting groove (5110) may be concavely formed toward an optical axis lest screw threads of the third screw part (6300) be inserted. Although the first screw part (5100) may be disconnected of screw threads by the first mounting groove (5110), the third screw part (6300) may be continuously formed to allow the lens holder (6000) and the lens barrel (5000) to be screw-connected without problem.

Meanwhile, albeit not being illustrated in the drawings, the third screw part (6300) may be formed with the first mounting groove (5110) to allow mounting the second conductive part (8220) of the conductive part (8200), and the first screw part (5100) may be continuously and connectively formed to allow a formed position of the first mounting groove (5110) to be selected upon the manufacturer's intention.

The front body (7000) may include, at an inner circumferential surface, a fourth screw part (7100) formed with a screw thread corresponding to that of the second screw part (5200) of the lens barrel (5000). The fourth screw part (7100) may be coupled to the second screw part (5200). The second screw part (5200) may not be formed at a partial portion with a screw thread, but instead formed with a relatively recessed second mounting groove (5210) over the screw thread. The second mounting groove (5210) may be formed with a width wider than that of the second conductive part (8220) to allow a second conductive part (8220) of the conductive part (8200) to be arranged, and the height of the screw thread is formed higher than the thickness of the second conductive part (8220), whereby even if the second conductive part (8220) of the conductive part (8200) is mounted in the first mounting groove (5110), the screw-connection between the front body (7000) and the lens barrel (5000) is not affected, and damage to the conductive part (8200) by the screw thread can be also prevented.

To be more specific, the second mounting groove (5210) may be concavely formed toward an optical axis lest screw threads of the fourth screw part (7100) be inserted. Although the second screw part (5200) may be disconnected of screw threads by the second mounting groove (5210), the fourth screw part (7100) may be continuously formed to allow the front body (7000) and the lens barrel (5000) to be screw-connected without problem.

Meanwhile, albeit not being illustrated in the drawings, the fourth screw part (7100) may be formed with the second mounting groove (5210) to allow mounting the second conductive part (8220) of the conductive part (8200), and the second screw part (5200) may be continuously and connectively formed to allow a formed position of the second mounting groove (5210) to be selected upon the manufacturer's intention.

FIG. 14 is a schematic view illustrating a lens holder (6000) being arranged on a lens (1000) at a camera module according to an exemplary embodiment of the present invention, particularly showing C of FIG. 11.

Referring to FIG. 14, the lens holder (6000) may further include a pressure part (6200) to apply a pressure to an outermost lens (1000a). At this time, the pressure part (6200) may take a shape of being bent toward a through hole (6100). The pressure part (6200) may face, at one surface, an incident face (1100) of the lens (1000), and may be formed with a curvature to allow the said one surface to correspond to a spherical surface of the incident surface (1100).

A first conductive part (8210) of the conductive part (8200) may be formed between the said one surface of the pressure part (6200) and the heating layer (2000) formed on the incident surface (1100) of the outermost lens (1000a). That is, the lens holder (6000) may be screw-connected to the lens barrel (5000) to allow the first conductive part (8210) to apply a pressure toward the heating layer (2000) and to thereby fix the heating layer (2000).

The assembly of camera module thus described according to the exemplary embodiment of the present invention will be explained in the following manner.

First, the incident surface (1100) of the outermost lens (1000a) disposed at an outermost area at a subject side is coated with a conductive material.

Then, the lens (1000) is accommodated into and coupled to the lens barrel (5000). At this time, the outermost lens (1000a) at the subject side is arranged at one side of the lens barrel (5000).

Next, the conductive part (8200) is prepared to allow the first conductive part (8210) to contact the heating layer (2000), and to allow the second conductive part (8220) to be inserted into the first and second mounting grooves (5110, 5210) formed at an outside of the lens barrel (5000).

The lens holder (6000) is prepared to allow covering the lens (1000) and the lens barrel (5000) to allow a portion of the outermost lens (1000a) to pass through the through hole (6100) of the lens holder (6000), and to allow the lens barrel (5000) to be screw-connected by rotating the lens holder (6000) to one direction. At this time, an outer circumferential surface of the lens barrel (5000) is formed with the first screw part (5100), an inner circumferential surface of the lens holder (6000) is formed with the third screw part (6300) corresponding to the first screw part (5100), and the first screw part (5100) is formed with the first mounting groove (5110) that is recessed and inserted by the second conductive part (8220), such that the second conductive part (8220) is prevented from being damaged by the third screw part (6300).

Furthermore, the first mounting groove (5110) is formed with the first screw part (5100) to allow the lens barrel (5000) and the lens holder (6000) to be screw-connected because the third screw part (6300) is continuously formed even if the screw threads are disconnected.

Successively, the front body (7000) is prepared to allow the lens barrel (5000) to be screw-connected. At this time, an outer circumferential surface of the lens barrel (5000) is formed with the second screw part (5200) arranged by being spaced apart from the first screw part (5100), the second screw part (5200) is formed with the second mounting groove (5210) that is recessed to allow the second conductive part (8220) to be inserted, and an inner circumferential surface of the front body (7000) is formed with the fourth screw part (7100) corresponding to the second screw part (5200), such that the second conductive part (8220) is not damaged by the fourth screw part (7100). Furthermore, the second mounting groove (5210) is formed on the second screw part (5200) to allow the lens barrel (5000) and the front body (7000) to be screw-connected because the fourth screw part (7100) is continuously formed even if the threads are disconnected.

Furthermore, the second conductive part (8220) is connected to the PCB (8100) in order to be electrically connected. At this time, the PCB (8100) and the second conductive part (8220) can be electrically connected by a connector (not shown). However, the present invention is not limited thereto.

Thereafter, the rear body (8000) pierced by a cable (not shown) is prepared in order to be electrically connected, and is coupled to the front body (7000). At this time, a separate fixing member (not shown) is prepared to allow the PCB (8100) to be fixed at an inside of the rear body (8000), so that the cable can be electrically connected to the PCB (8100) and the PCB (8100) can be fixed at an inner space formed by the front body (7000) and the rear body (8000).

Although the abovementioned explanation is exemplary embodiments to implement a camera module according to the present invention, the present invention is not limited thereto. Thereby, it should be appreciated by the skilled in the art that changes, modifications and amendments to the above examples may be made without deviating from the scope of protection of the invention.

The invention claimed is:

1. A camera module, comprising:
    a lens including an incident surface upon which outside light is incident;
    a heating layer arranged at the incident surface of the lens to be heatable by a supplied current;
    a lens barrel fixing the lens by accommodating the lens;
    a printed circuit board (PCB) so arranged as to be spaced apart from the lens barrel;
    a lens holder covering at least a portion of an edge of the incident surface and coupling the lens barrel by accommodating the lens barrel;
    a conductive part positioned at an outside of the lens barrel, electrically connecting the heating layer with the PCB, formed in a shape of a strip having a predetermined width, and at least a portion of the conductive part being interposed between the lens holder and the incident surface to be applied with a pressure by the lens holder;
    wherein the lens barrel includes a first screw part formed at one portion of an outside with a screw thread, and a second screw part formed at an other portion of the outside with a screw thread formed to be spaced apart from the first screw part, wherein at least one portion of each of the first and second screw parts includes first and second grooves relatively recessed over the screw threads formed at the first and second screw parts in order to allow the conductive part to be positioned.

2. The camera module of claim 1, wherein the lens holder is formed with a through hole to expose to an outside, a lens is positioned at an outmost position in order to be nearest to a subject, and includes a pressure part to apply a pressure to the conductive part.

3. The camera module of claim 1, wherein the conductive part includes a first conductive part having a radius of curvature corresponding to that of an edge of the heating layer and interposed between the heating layer and the lens holder, and a second conductive part extended from the first conductive part to contact the PCB, wherein the first conductive part and the second conductive part are substantially arranged in a shape of "T" and the first conductive part and the second conductive part are bendable.

4. The camera module of claim 1, wherein the lens holder includes a third screw part formed with a screw thread corresponding to that of the first screw part, and includes a front body formed with a through hole passed through by a portion of the lens barrel and formed with a fourth screw part corresponding to the second screw part, and a rear body coupled to the front body to form an inner space, wherein the PCB is accommodated inside the inner space to be fixed to the front body or to an inside of the rear body.

5. The camera module of claim 1, comprising a heating wire having a bottom surface in contact with a surface of the lens, lateral surfaces in contact with the heating layer, and a top surface in contact with a coating layer, the heating wire generating heat when a current is supplied thereto from an external power supply and being electrically connected to the heating layer.

6. The camera module of claim 5, wherein the heating layer is positioned on a portion of the incident surface or a light emitting surface of the lens, and the heating wire is arranged at an area other than where the heating layer is positioned on the incident surface or the light emitting surface.

7. The camera module of claim 5, wherein the heating layer is positioned on an entire surface of any of the incident surface and a light emitting surface of the lens, and the heating wire is interposed between the heating layer and the lens on the incident surface or the light emitting surface.

8. The camera module of claim 5, wherein the heating layer is positioned on an entire surface of any of the incident surface and the light emitting surface, and the heating wire is positioned at an external surface of the heating layer.

9. The camera module of claim 5, wherein the heating wire includes a silver nano material formed in a predetermined pattern.

10. The camera module of claim 5, wherein the heating wire includes an anode line and a cathode line, each line indicating a different polarity, wherein the anode line and the cathode line are spaced apart from each other.

11. The camera module of claim 10, wherein the anode line and the cathode line form an arc on a surface of the lens, and are alternately arranged toward a center of the surface of the lens from an external side of the surface of the lens.

12. The camera module of claim 5, wherein the heating wire includes an anode line and a cathode line, each line indicating a different polarity, wherein the anode line and the cathode line are spaced apart from each other, and
wherein the anode line and the cathode line each includes a plurality of arc-shaped arc parts, each having a different radius, and the plurality of arc parts has a same center, each arc part being formed in a zigzag manner.

13. The camera module of claim 5, wherein the heating wire is formed in a spiral shape toward a center portion of a surface of the lens from an external side of the lens, and an anode and a cathode are mutually connected at the center portion.

14. The camera module of claim 1, wherein the heating layer comprises a conductive layer including any one or more of ITO (Indium Tin Oxide), WO (Indium Zinc Oxide), ZnO, Graphene, and CNT (Carbon Nano Tube).

15. The camera module of claim 1, wherein the conductive part is a flexible PCB (FPCB) or a conductive film.

16. A camera module, comprising:
a lens including an incident surface upon which outside light is incident;
a heating layer arranged at the incident surface of the lens to be heatable by a supplied current;
a lens barrel formed with an insulation material to fix the lens by accommodating the lens;
a printed circuit board (PCB) so arranged as to be spaced apart from the lens barrel; and
a conductive part coated with a conductive material at an outside of the lens barrel, and electrically connected at one end and the other end with the heating layer and the PCB respectively;
wherein the lens barrel includes a first screw part formed at one portion of an outside with a screw thread, and a second screw part formed at an other portion of the outside with a screw thread formed to be spaced apart from the first screw part, wherein at least one portion of each of the first and second screw parts includes first and second grooves relatively recessed over the screw threads formed at the first and second screw parts in order to allow the conductive part to be positioned.

* * * * *